Patented Apr. 28, 1942

2,280,843

UNITED STATES PATENT OFFICE 2,280,843

METHOD OF CONCENTRATING THE STEROL CONTENT OF TALL OIL

Anthony F. Oliver and Robert C. Palmer, Pensacola, Fla., assignors to Newport Industries, Inc., Pensacola, Fla., a corporation of Delaware No Drawing. Application September 30, 1940, Serial No. 359,086

12 Claims. (Cl. 260—97.5)

This invention relates to a process for isolating from crude tall oil a fraction rich in vegetable sterols. More particularly the invention pertains to a process for extracting vegetable sterols from tall oil by means of naturally occurring or synthetic adsorbent materials typified by fuller's earth, bentonite, sepiolite and activated charcoal.

Tall oil is a by-product in the manufacture of paper pulp by the digestion of wood with alkaline liquors, in particular, aqueous alkaline solutions of sodium sulfide. Crude tall oil is produced by acidification of sodium soaps salted out of the alkaline liquor and constitutes a dark, evil-smelling mixture consisting of a mixture of roughly equal proportions of resin acids and fatty acids such as oleic, linoleic and linoleic acids, together with minor proportions of esters and unsaponifiable matter, chiefly plant sterols. The evil-smell is probably due to sulfur compounds present in the oil.

It has heretofore been proposed to isolate vegetable sterols from the aforementioned soaps prior to their acidification to separate crude tall oil therefrom. A specific method comprises drying said soap, extracting the soap in concentrated state with a solvent for the sterols, mainly phytosterol, and the non-saponifiable matter present in the soap, removing impurities from the extract by shaking it with an alkaline material, distilling off the solvent and crystallizing the residue to obtain pure phytosterol.

We have found that a separation of tall oil into a major fraction containing a minor part of the original sterol content of the crude tall oil, and into a minor fraction containing a major portion of the original sterol content may be effected by a filtration of the crude tall oil through a stationary bed or mass of an adsorbent meduim such as fuller's earth, activated bentonite, a magnesium silicate such as sepiolite, or other decolorizing clay, activated charcoal, or like adsorbent material. We have also found that such selective adsorption of the sterols by adsorbent media is effected only when the crude oil is in a dissolved state in an organic solvent, not when the tall oil is in an undiluted condition. Further, the nature of the solvent employed is of critical importance, for the sterols are not dissolved selectively from solutions of crude tall oil in alcohols or other organic solvents readily miscible with water.

Besides the sterols, the adsorbent media retain the major portion of the color bodies and other oxidized matter as well as the sulfur containing substances present in the crude tall oil. The filtrate is a light colored liquid, substantially free from objectionable odor.

We have further found that the sterols and other matter retained by the adsorbent media may be substantially completely removed therefrom and the adsorbent medium rendered suitable for reuse by washing the media with a solvent. The nature of the solvent employed in this washing is of critical importance, for organic solvents readily miscible with water remove the adsorbed matter with ease, whereas hydrocarbons and other solvents immiscible with water require either such large volumes of washing liquid or a washing repeated so many times as to render the washing with such solvents impractical.

Pure plant sterols may be isolated from the mixture of sterols, color bodies and sulfur containing materials retained by the adsorbent media and extracted therefrom by organic solvents readily miscible with water.

It is therefore an important object of the present invention to provide a method for isolating from crude tall oil a fraction containing the major portion of the plant sterol content of the crude tall oil.

Another important object of this invention is to provide a method for separating crude tall oil into a major fraction containing a minor portion of the plant sterol, color body and sulfur compound content of the crude tall oil and a minor fraction comprising the greater portion of the plant sterol, color body and sulfur compound content of the crude tall oil.

A more specific object of the invention is to provide a method for isolating from crude tall oil a fraction rich in plant sterols by filtering crude tall oil dissolved in a solvent immiscible with water through a mass of adsorbent media and subsequently extracting the latter with a solvent miscible with water to recover the greater portion of the plant sterol content of the crude tall oil in admixture with the greater portion of the color body and sulfur containing compound content of the crude tall oil.

Other and further important objects of this invention will become apparent to those skilled in the art from the following description and appended claims.

When proceeding in accordance with this invention, crude tall oil is dissolved in a liquid, preferably an aliphatic hydrocarbon, such as petroleum naphtha, prior to treatment with fuller's earth or other adsorbent material. The concentration of tall oil in the resulting solution may suitably be between 12 and 20% by weight. Certain solid insoluble color bodies amounting to about 1.5 per cent of the crude oil may then, if desired, be separated by decantation. The dissolved tall oil is suitably filtered through an amount, by weight, of adsorbent material at least equal to the quantity of tall oil being treated. Although the amount of color bodies and other substances removed from the tall oil solution can be controlled to some extent by regulating the amount of adsorbent material used, an absolutely complete removal is difficult. A suitable ratio of fuller's earth to tall oil is two parts to one by weight. Such treatment, in the case of an 18 per cent petroleum naphtha solution of crude tall oil, yields, after removal of the solvent, an 85 per cent fraction of pale, nearly odorless tall oil and a 15 per cent fraction retained by the adsorbent mass which consists of a black, evil-smelling liquid more viscous than the crude tall oil. This retained fraction contains a major portion of the plant sterols present in the crude tall oil.

The following analyses will indicate the effect of this illustrative treatment with fuller's earth of a solution of crude tall oil in petroleum naphtha in concentrating the sterol content:

|  | 100% crude T. O. | 85% fraction refined T. O. | 15% fraction color bodies |
|---|---|---|---|
| Percent unsaponifiable | 4.7 | 3.5 | 12.8 |
| Acetyl value of unsap | 105 | 99 | 106 |
| Percent sterols in unsap., from acetyl value (131 acetyl value=theory for steryl acetate) | 78.3 | 73.7 | 81.0 |
| Percent sterols (percent of total) | 3.7 | 2.6 | 10.4 |

Increase in concentration of sterols in color bodies over that in crude=10.4/3.7=282%.
The concentration of sterols in the color bodies is 2.82 times that in the original crude tall oil and 4.02 times that in the refined.

The ratio between fatty acids and resin acids in the fraction adsorbed by the adsorbent medium does not differ greatly from the ratio in the crude tall oil, thereby indicating that the color bodies retained by the adsorbent medium are derived both from the fatty acids and the resin acids.

Prior to the extractive treatment, according to this invention, of a mass of adsorbent material saturated with the black, viscous liquid described hereinabove, the residual tall oil solution still wetting the mass is preferably displaced by pumping a solvent through the mass of adsorbent material. For this purpose a hydrocarbon identical with that used to dissolve the crude tall oil can advantageously be employed, for such a hydrocarbon will neither extract any significant amount of sterols, color bodies or sulfur containing compounds from the adsorbent mass to remix the same with the tall oil solution being displaced, nor introduce another type of solvent into the latter. As disclosed hereinbelow in greater detail, such hydrocarbons further do not have any adverse effect on the subsequently used water miscible solvent, which will inevitably become intermixed therewith in the subsequent washing of the adsorbent mass.

The displacing hydrocarbon solvent is preferably used hot, so as to raise the temperature of the mass of adsorbent material to one almost equal to the boiling point of the water miscible "extracting solvent" used in the next succeeding step.

The "extracting solvent" is selected from a group of organic solvents which are at least somewhat miscible with water and readily miscible with aliphatic hydrocarbons. Typical examples of such solvents are the lower aliphatic alcohols, for instance, methyl, ethyl, iso-propyl, normal butyl and tertiary butyl alcohols, cyclic alcohols such as benzyl alcohol and furfuryl alcohol, esters such as ethyl acetate, ketones such as acetone, aldehydes such as furfuraldehyde, aliphatic mixed alcohol-ethers such as diethylene glycol mono butylether, and phenolic compounds such as ordinary phenol, all of which are completely soluble in petroleum naphtha at elevated temperatures and miscible with water to an extent of upwards of 4 per cent or more at ordinary temperatures. Aromatic amines such as ortho-toluidine and aniline are also effective, although less so than, for instance, benzyl alcohol. Ethyl ether is even less effective although more efficient than the hydrocarbons, which are inoperative for practical purposes. The effective extracting solvents are thus distinguished by the presence of polar groups in their molecules. The less effective extracting solvents contain less potent polar groups such as the amino and ether groups. The inoperative hydrocarbons are typical non-polar compounds.

The extracting potency of the more efficient solvents according to this invention is so great that the solvents may be diluted with considerable amounts of non-polar diluents such as liquid aliphatic hydrocarbons without significantly decreasing their extracting efficiency. Such admixture of hydrocarbons is in fact advantageous, for it cuts down the losses of the relatively more expensive polar solvents which tend to be retained by the adsorbing materials. The hydrocarbons also aid in maintaining the dryness both of the extracting solvents and the adsorbing materials.

For such dilution a "light petroleum distillate" is particularly suitable. By this term we signify all of the various fractions obtained by distilling petroleum which are liquid at normal temperatures and which have a viscosity low enough to allow the fractions to pass through the filter mass without difficulty. Petroleum naphtha is the preferred diluent.

Extracting solvents more volatile than petroleum naphtha are preferred. Solvents having hydroxyl, carbonyl or ester groups, such as ethyl alcohol, methyl alcohol, acetone and ethyl acetate form the most practical extracting means. Such low boiling solvents may be fractionally distilled from a petroleum distillate, such as petroleum naphtha, and recovered completely in greater concentration than that which existed in the original mixture to be distilled, provided the original mixture contained an excess of hydrocarbons.

The preferred extracting means of this invention thus include blends of light petroleum distillates with the lower aliphatic alcohols which may contain as much as 65 per cent or more of petroleum distillate. In order to facilitate the intermixture of petroleum naphtha with ordinary 95 per cent ethyl alcohol the latter is preferably first dehydrated to a concentration of 97 to 98 per cent, although an operative mixture may be prepared with 95 per cent ethyl alcohol.

For example, equal proportions of 98 per cent ethyl alcohol and petroleum naphtha may be used, preferably but not necessarily at almost the boiling point of the mixture, to wash out plant sterols, color bodies and sulfur containing compounds from a mass of adsorbent material from which the tall oil solution has been displaced as disclosed hereinabove. The hot alcohol-petroleum naphtha mixture is introduced under pressure into the mass, as by means of a pump, thus initially displacing the petroleum naphtha introduced to displace the tall oil solution and subsequently washing the mass of adsorbent material.

The amount of alcohol-naphtha mixture to be used depends somewhat on the amount of sterols and other compounds adsorbed and on the natures of the adsorbing mass and of the solvent used, but in general an amount of mixture equal in volume to the adsorbent mass will be satisfactory.

The extracting solvent, or alcohol-naphtha mixture, is then displaced with, say, petroleum naphtha, from the adsorbent mass until substantially all of the solvent has been removed. The extract and the petroleum naphtha or other hydrocarbon used as a wash, if desired, may be collected in the same vessel whereby the polar solvent becomes mixed with an excess of non-polar diluent. The solvent, if it has a lower boiling point than the diluent, can then be recovered free from the extracted material by fractional distillation of the mixture. In the case of an ethyl alcohol-petroleum naphtha mixture, the distillation may be interrupted at the point where all the alcohol has been distilled off, to yield a distillate which will be found to contain about the right proportions of alcohol and petroleum naphtha for reuse as an extracting agent.

While it is possible to recover separately the extracting solvent and the hydrocarbon displacing the same, such a process offers no particular advantage, for even when an undiluted solvent is used for washing, some dilution is inevitable due to intermixing with the hydrocarbon which the solvent first displaces and by which it is subsequently displaced. The solvent may be recovered apart from the hydrocarbon by the distillation of the jointly recovered solvent and hydrocarbon.

After the solvent has been distilled off, the distillation is continued to boil off the hydrocarbon and to recover as a residue the black viscous liquid described hereinabove from which pure plant sterols may then be isolated, as by extraction and recrystallization from alcohol.

The black viscous concentrate, for example, may be dissolved in hot alcohol, and the sterols recovered therefrom by crystallization. Several recrystallizations give the sterols in very pure form. An alternative method is to saponify the entire black viscous mass with an aqueous caustic alkali solution. The mass is then diluted with a sufficient amount of water to avoid the formation of an emulsion and extracted with warm light naphtha. The naphtha extract, containing the sterols, is then evaporated to give partially refined sterols, which can be further purified by crystallization from alcohol.

Instead of displacing the last portion of the washing solvent from the adsorbent mass, the washing may be interrupted after all the adsorbed matter has been washed out and any solvent remaining in the adsorbent mass may be distilled from the clay, for instance, by raising the temperature to the boiling point of the solvent whereby any higher boiling diluent is left in the mass.

When polar solvents having boiling points above that of the diluent are used, the process must be varied accordingly. It is not practical to utilize mixtures of polar solvents and non-polar diluents having about the same boiling range.

The temperature at which the washing step is performed is not limited except that it must be above the temperature of substantial miscibility of the washing liquid and the diluent, if one is used, and below the boiling point of the washing solvent or mixture. A suitable temperature in the case of ethyl alcohol-petroleum naphtha mixtures is 65° C.

In general, the broad principles of this invention include dissolving crude tall oil in a non-polar organic solvent, filtering the resulting solution through a mass of an adsorbent medium and extracting from said medium a minor fraction rich in plant sterols by means of a polar organic solvent. Many details of the process may be varied through a wide range without departing from the principles of the invention and we, therefore, do not purpose limiting the patent granted hereon otherwise than necessitated by the scope of the appended claims.

We claim as our invention:

1. A method of concentrating the plant sterol content of tall oil which comprises dissolving tall oil in a liquid hydrocarbon, filtering the resulting solution through a stationary mass of an adsorbent medium, introducing a liquid hydrocarbon into said mass to displace said solution and washing said mass with an organic solvent soluble in water to an extent at least equal to 4 per cent and also miscible with said latter hydrocarbon to recover a solution of a tall oil fraction rich in sterols.

2. A method of concentrating the sterol content of tall oil which comprises dissolving crude tall oil in a liquid aliphatic hydrocarbon, filtering the resulting solution through a stationary mass of an adsorbent medium, introducing a liquid hydrocarbon into said mass to displace said solution, extracting said mass with an organic solvent soluble in water to an extent at least equal to 4 per cent and also miscible with said latter hydrocarbon and removing the solvent from the resulting extract to recover a tall oil fraction rich in plant sterols.

3. A method of concentrating the plant sterol content of tall oil which comprises dissolving crude tall oil in a light petroleum distillate, filtering the resulting solution through a stationary mass of adsorbent clay, forcibly introducing a light petroleum distillate into said mass to displace said solution, washing said mass with an aliphatic alcohol having a boiling point lower than said distillate to extract sterols and color bodies retained by said mass and removing the solvent from the resulting extract to recover a tall oil fraction containing a major portion of the plant sterol and color body content of the crude tall oil.

4. A method of concentrating the plant sterol content of tall oil which comprises dissolving crude tall oil in a light petroleum distillate, filtering the resulting solution through a stationary mass of adsorbent clay, forcibly introducing into said mass a light petroleum distillate to displace said solution, washing said mass with a mixture of a light petroleum distillate and an aliphatic alcohol having a boiling point lower than said last-mentioned petroleum distillate and removing the mixture from the resulting extract to recover a minor tall oil fraction containing a major portion of the plant sterol and color body content of the crude tall oil.

5. A method of concentrating the plant sterol content of tall oil which comprises dissolving crude tall oil in a light petroleum distillate having a boiling range above that of ethyl alcohol, filtering the resulting solution through a bed of fuller's earth, forcibly introducing into said bed an additional amount of said petroleum distillate to displace said solution, washing said bed with a hot mixture of said petroleum distillate and ethyl alcohol and distilling off said mixture from the resulting extract to recover a minor tall oil fraction containing a major portion of the plant sterol and color body content of the crude tall oil.

6. The method of recovering a tall oil fraction rich in sterols from a mass of adsorbent material saturated therewith and wetted with a solution of tall oil in a liquid hydrocarbon which comprises displacing said solution with a liquid hydrocarbon, washing said mass with an organic solvent soluble in water to an extent at least equal to 4 percent and miscible with liquid hydrocarbons and distilling off the solvent from the resulting extract.

7. The method of recovering a tall oil fraction rich in sterols from a mass of adsorbent material saturated therewith and wetted with a solution of tall oil in a petroleum distillate which comprises forcibly introducing a light petroleum distillate into said mass to displace said solution, washing said mass with a mixture of a light petroleum distillate and a liquid alcohol having a boiling point outside the boiling range of said distillate, and distilling off said mixture from the resulting extract.

8. The method of recovering a tall oil fraction rich in sterols from a mass of adsorbent material saturated therewith and wetted with a solution of tall oil in a light petroleum distillate which comprises forcibly introducing a light petroleum distillate into said mass to displace said solution, washing said mass with a mixture of a light petroleum distillate and a water miscible liquid ketone having a boiling point outside the boiling range of said distillate and distilling off said mixture from the resulting extract.

9. The method of recovering a tall oil fraction rich in sterols from a mass of adsorbent material saturated therewith and wetted with a solution of tall oil in a light petroleum distillate which comprises forcibly introducing a light petroleum distillate into said mass to displace said solution, washing said mass with a mixture of a light petroleum distillate and a water miscible liquid ester having a boiling point outside the boiling range of said distillate and distilling off said mixture from the resulting extract.

10. The method of recovering a tall oil fraction rich in sterols from a mass of fuller's earth saturated therewith and wetted with a solution of tall oil in petroleum naphtha which comprises introducing petroleum naphtha into said mass to displace said solution, washing said mass with a mixture of a petroleum naphtha and an aliphatic alcohol having a boiling point below that of petroleum naphtha and distilling off said mixture from the resulting extract.

11. A method of recovering the sterol content of tall oil which comprises dissolving the tall oil in an organic solvent immiscible with water, filtering the resulting solution through a mass of an adsorbent material capable of adsorbing the sterol content of said tall oil, washing the adsorbent material with another organic solvent which is a solvent for said sterols and is soluble in water to an extent at least equal to 4 per cent and miscible with said first solvent, and isolating the sterol content of the tall oil from its solution in said solvent used for washing.

12. A method of concentrating the sterol content of tall oil which comprises dissolving the tall oil in an organic solvent immiscible with water, filtering the resulting solution through a mass of an adsorbent material capable of adsorbing the sterol content of said tall oil, washing the adsorbent material with another organic solvent which is a solvent for said sterol and soluble in water to an extent at least equal to 4 per cent and miscible with said first solvent, and removing the solvent from the resulting extract, to isolate a tall oil fraction rich in sterols.

ANTHONY F. OLIVER.
ROBERT C. PALMER.